US009366338B2

(12) United States Patent
Herrmann et al.

(10) Patent No.: US 9,366,338 B2
(45) Date of Patent: Jun. 14, 2016

(54) HYDRAULIC CONTROL SYSTEM FOR ACTUATING A SHIFTING ELEMENT

(75) Inventors: Markus Herrmann, Scheidegg (DE); Thilo Schmidt, Meckenbeuren (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 941 days.

(21) Appl. No.: 13/531,812

(22) Filed: Jun. 25, 2012

(65) Prior Publication Data

US 2012/0329606 A1   Dec. 27, 2012

(30) Foreign Application Priority Data

Jun. 27, 2011   (DE) .................. 10 2011 078 113

(51) Int. Cl.
*F16H 61/26* (2006.01)
*F16H 61/02* (2006.01)
*F16H 61/06* (2006.01)

(52) U.S. Cl.
CPC .......... *F16H 61/0206* (2013.01); *F16H 61/061* (2013.01); *Y10T 477/6936* (2015.01)

(58) Field of Classification Search
CPC ............. F16H 61/0206; F16H 61/061; Y10T 477/6936; Y10T 137/86582; Y10T 137/87193
USPC .................. 137/625.6, 596.14; 192/3.2, 3.33; 477/150, 159, 175, 906
See application file for complete search history.

(56) References Cited

U.S. PATENT DOCUMENTS

| 4,150,543 | A  | * | 4/1979  | Helmer et al. ............... 60/403 |
| 7,628,261 | B2 |   | 12/2009 | Gierer et al. |
| 7,736,270 | B2 |   | 6/2010  | Gierer et al. |
| 7,794,349 | B2 |   | 9/2010  | Gierer et al. |
| 2011/0138957 | A1 | | 6/2011  | Schmidt et al. |

FOREIGN PATENT DOCUMENTS

| DE | 10 2004 020 569 A1 | 12/2005 |
| DE | 10 2005 012 590 A1 | 9/2006  |
| DE | 10 2006 006 180 A1 | 8/2007  |
| DE | 10 2007 055 811 A1 | 6/2009  |
| DE | 10 2009 054 541 A1 | 6/2011  |

* cited by examiner

*Primary Examiner* — Craig J Price
(74) *Attorney, Agent, or Firm* — Davis & Bujold PLLC; Michael J. Bujold

(57) ABSTRACT

A hydraulic system for actuating a transmission shifting element that comprises control and shifting valves. A first surface of a valve slide of the control valve is a differential surface between two functional surfaces of the slide that axially bound an area of the slide having a smaller diameter, by which the actuation pressure is adjusted. When the shifting valve is in a second switch position, a total force component acts upon the slide of the control valve which moves the slide such that the actuation pressure is equal to a system pressure. The total force component corresponds at least to the sum of a first force component equivalent to a pressure signal applied to a second surface of the slide of the control valve and a second force component equivalent to an actuation pressure applied to the first surface of the slide of the control valve.

7 Claims, 5 Drawing Sheets

HYDRAULIC CONTROL SYSTEM FOR ACTUATING A SHIFTING ELEMENT

This application claims priority from German patent application serial no. 10 2011 078 113.7 filed Jun. 27, 2011.

FIELD OF THE INVENTION

The invention concerns a hydraulic system for actuating at least one shifting element of a transmission device.

BACKGROUND OF THE INVENTION

In transmission devices known from the prior art, such as automatic torque converters, a shifting element such as a clutch or brake is actuated by means of a pilot-controllable control valve device and, in functional connection with it, a shifting valve device which is also pilot-controllable. By means of a pressure regulation device, the pilot pressure for the control valve device and the shifting valve device is set as a function of an electric control signal, the pressure regulation device having a defined working pressure range which is usually substantially lower than the actuation pressure of the shifting element. In order to be able to actuate the shifting element with pressure values higher by comparison with the pilot pressure of the control valve device and the shifting valve device, the control valve device is connected downstream from the pressure regulation device, in the area of which the pilot pressure of the pressure regulation device is changed to a higher level.

During driving operation of a vehicle constructed with the transmission device it must be ensured that in the fully engaged operating condition of the shifting element, the shifting element has its maximum transmission capability and operates without slip. For this the actuation pressure at the end of the control pressure range of the actuation pressure is increased abruptly to a higher pressure value that usually corresponds to a so-termed system pressure. The switch-over or at least almost abrupt increase of the actuation pressure is brought about by the shifting valve device controlled in parallel by the pressure regulation device, which however is only actuated, or brought from a first to a second switch condition, at high pilot pressures.

By means of the shifting valve device, the feedback of the actuation pressure to the control valve device is deactivated when the shifting valve device is in a second switch condition, so that the control valve device is changed from a so-termed modulation position to an operating condition in which the system pressure applied at the control valve device is passed through completely in the direction toward the shifting element.

However, the disadvantage of this is that the control valve devices known from the prior art occupy an undesirably large amount of installation space in the axial direction, and the control characteristics of the control valve device are impaired to an undesired extent due to the axial length of a valve slide of the control valve device.

SUMMARY OF THE INVENTION

Thus, the purpose of the present invention is to provide a hydraulic system by means of which a shifting element of a transmission device can be actuated in a better-controlled manner.

The hydraulic system according to the invention for actuating at least one shifting element of a transmission device is made with a pilot-controlled control valve device and, in functional connection therewith, an also pilot-controlled shifting valve device. An actuation pressure of the shifting element can be regulated by means of the control valve device within a predefined pilot pressure range and when the shifting valve device is in a first switch condition. Above a pilot pressure value that can be applied to a first functional surface of a valve slide of the shifting valve device, the shifting valve device has a second switch condition in which the actuation pressure of the shifting element corresponds to a system pressure that can be applied to the control valve device. The actuation pressure of the shifting element can be applied to a first functional surface of a valve slide of the control valve device, in an action direction that reduces the actuation pressure.

Since the first functional surface of the valve slide of the control valve device, to which the actuation pressure can be applied, is a differential surface between two functional surfaces of the valve slide which bound, in the axial direction, an area of the valve slide of the control valve device with a smaller diameter, by virtue of which the actuation pressure can be adjusted conjointly with switch tongues, by comparison with designs known from the prior art in which the first functional surface is provided in the area of a separate or additional valve collar which can only be made with a large axial length of the valve slide, in this case the fitting space needed for the control valve device is small and the axial length of the valve slide of the control valve device is smaller. Thus, the control valve device of the hydraulic system according to the invention has good control characteristics which, compared with known solutions, are improved by the smaller transverse forces exerted on a shorter valve slide. The transverse forces result, among other things, from deformations of a housing of the control valve device and from manufacturing tolerances which impair the free-movement properties of the valve slide in the valve housing of the control valve device.

However, the first functional surface of the valve slide of the control valve device, which constitutes an integrated restoring surface, has the result that the pressure exerted on the first functional surface of the valve slide of the control valve device cannot be shut off as it can in the known solutions and the valve slide of the control valve device has to be changed by some additional measure to an operating condition in which the actuation pressure of the shifting element assumes a value that ensures slip-free operation of the shifting element.

To ensure this, the hydraulic system according to the invention is designed such that when the shifting valve is in its second switch condition, the valve slide of the control valve device is acted upon by a total force component that moves the valve slide in the direction toward a position in which the actuation pressure is equal to the system pressure, the total force component being at least the sum of a first force component equivalent to a pressure signal acting on a second functional surface of the valve slide of the control valve device and a second force component equivalent to the actuation pressure acting upon the first functional surface of the valve slide of the control valve device.

In an advantageous embodiment of the hydraulic system according to the invention, when the valve device is in its second switch condition the actuation pressure of the shifting element is fed back as a pressure signal by the control valve device, via the shifting valve device, to the second functional surface of the valve slide of the control valve device. In this way, in a space-saving and inexpensive manner and without additional pressure control means the actuation pressure of the shifting element can be increased to a pressure level required for slip-free operation of the shifting element in an operating-condition-dependent manner.

When, in the second switch condition of the shifting valve device, the system pressure is applied as a pressure signal to the second functional surface of the valve slide of the control valve device, the control valve device is securely overridden and the regulating function of the control valve device is deactivated, whereby the actuation pressure of the shifting element is no longer set above the pilot pressure value that can be applied on the first functional surface, but instead corresponds to the system pressure so that in the engaged condition operation takes place free from slip.

In a further advantageous embodiment of the hydraulic system according to the invention, below predefined pilot pressure values the valve slides of the shifting valve device and of the control valve device can in each case be moved by a respective spring device to defined starting positions in which the actuation pressure of the shifting element corresponds to a pre-filling pressure value. In a simple manner this ensures that in the disengaged operating condition of the shifting element a pressure space that can be acted upon by the actuation pressure of the shifting element is kept in a pre-filled operating condition, so that emptying of the pressure space and hence an accumulation of air in the pressure space, which would delay actuation of the shifting element, is avoided.

In the second switch condition of the shifting valve device, if the actuation pressure of the shifting element and the pilot pressure of the control valve device are applied as pressure signals to the second functional surface of the valve slide of the control valve device, in the second shift condition of the shifting valve device, the control valve device is securely overridden, the control function of the control valve device is deactivated, and the shifting element is acted upon by the actuation pressure required for its slip-free operation when the shifting element is engaged.

In a space-saving and inexpensive embodiment of the hydraulic system, the pilot pressure of the shifting valve device and of the control valve device can be set by means of a common pressure regulation device.

If the control valve device comprises an auxiliary piston arranged in series with the valve slide, which in the second switch condition of the shifting valve device can be acted upon in the area of a functional surface at least by the actuation pressure of the shifting element and which can be brought into functional connection with the valve slide of the control valve device, in such manner that the first force component can be applied by the auxiliary piston to the valve slide when the control function of the control valve device is activated, the valve slide of the control valve device can be made axially shorter compared with designs known from the prior art and can therefore be operated with better control quality. At the same time the control function of the control valve device can be deactivated by applying the actuation pressure to the auxiliary piston and not to the valve slide of the control valve device, and the shifting element can be acted upon with the pressure level required for slip-free operation of the shifting element in its engaged operating condition.

If the delivery line areas of the pilot pressure and the pressure signal to the second functional surface of the valve slide of the control valve device can be connected to the functional surface of the valve slide of the control valve device by way of a changeover valve device in such manner that by means of the changeover valve device in each case the higher pressure is applied to the second functional surface of the valve slide of the control valve device, then the control function of the control valve device can be deactivated independently of the pilot pressure and the actuation pressure can be controlled when the control function of the control valve device is activated, again reliably and independently of the actuation pressure of the shifting element.

Both the characteristics specified in the claims and those indicated in the following example embodiments of the hydraulic system according to the invention are suitable, in each case as such in isolation or in any combination with one another, as further developments of the object according to the invention. In relation to the further development of the object of the invention, the respective combinations of features do not represent any limitation but, rather, are described essentially only as examples.

Further advantages and advantageous embodiments of the hydraulic system according to the invention emerge from the claims and from the example embodiments whose principle is described below with reference to the drawings. For the sake of clarity, in the description of the various example embodiments the same indexes are used for components having the same structure and function.

BRIEF DESCRIPTION OF THE DRAWINGS

The drawings show:

FIG. 3: A control valve device of the hydraulic system of FIGS. 1 and 2, shown enlarged and in detail while

DETAILED DESCRIPTION OF THE PREFERRED EMBODIMENTS

Figure 1:
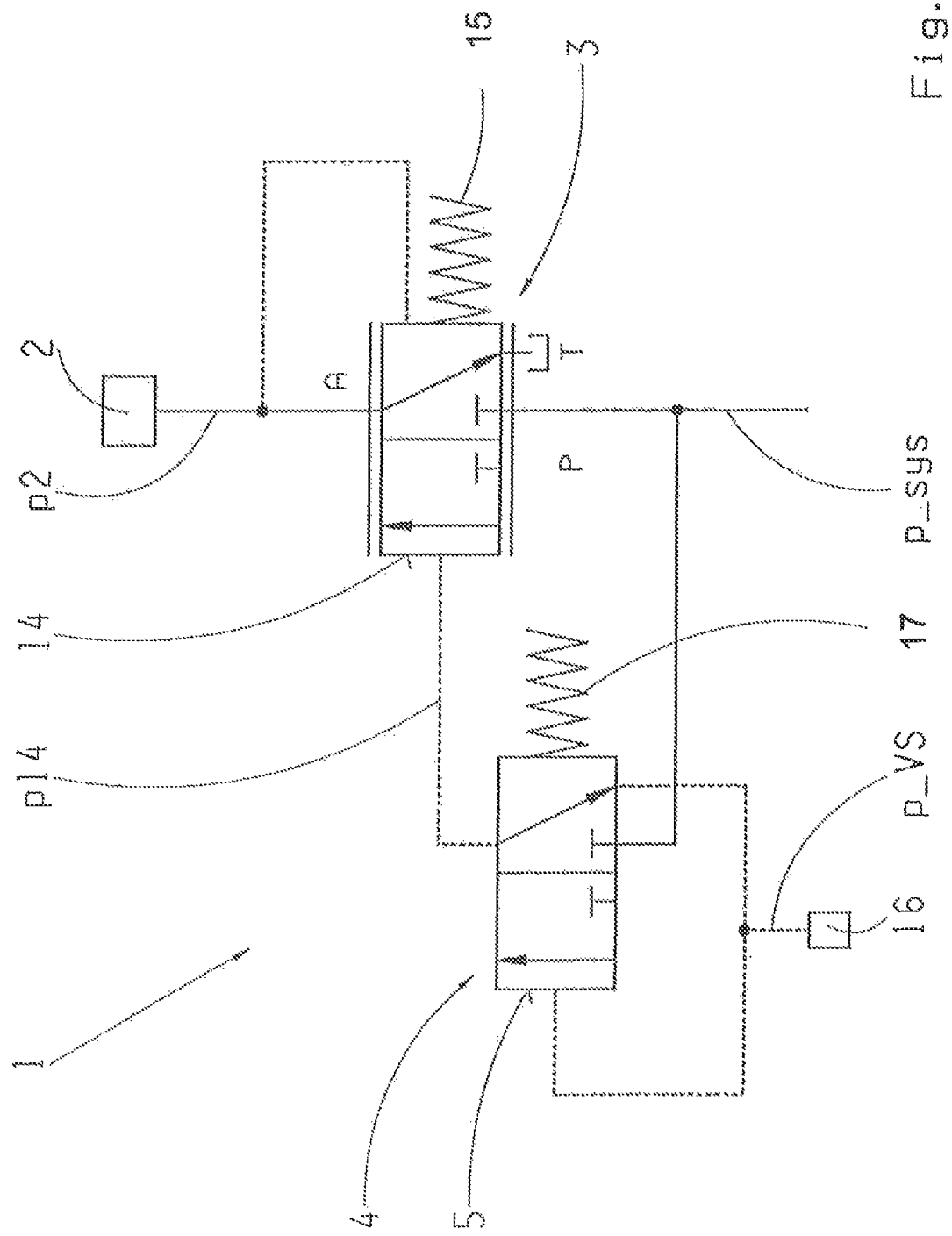
FIG. 1: Part of a first embodiment of the hydraulic system according to the invention.

FIG. 1 shows part of a first example embodiment of a hydraulic system 1 for actuating a shifting element 2 of a transmission device, in this case the shifting element 2 being a hydraulically actuated friction clutch of the transmission device. As a function of an actuation pressure p2 that can be applied to the shifting element 2, the transmission capability of the shifting element 2 can be varied between a value equal to zero and a maximum value.

The actuation pressure p2 of the shifting element 2 can be adjusted by means of a pilot-controlled control valve device 3 and, functionally connected thereto, an also pilot-controlled shifting valve device 4. In this case the actuation pressure p2 of the shifting element 2 can be regulated by the control valve device 3 within a defined pilot pressure range and when the shifting valve device 4 is in a first switch condition, as shown in FIG. 1. Above a certain pilot pressure value applied to a first functional surface 5 of a valve slide 6 of the shifting valve device 4, the shifting valve device 4 moves to a second switch condition shown in detail in FIG. 2, in which the actuation pressure p2 of the shifting element 2 corresponds to a system pressure p_sys that can be applied to the control valve device 3. The functional surface 7 is a differential surface or feedback surface, such that a first collar 8A of the valve slide 6 has a larger diameter than a second collar 8B of the valve slide 8 of the control valve device 3.

The actuation pressure p2 of the shifting element 2 can be applied to a first functional surface 7 of a valve slide 8 of the control valve device 3 (see FIG. 3A), in an action direction that reduces the actuation pressure p2. In the present case the functional surface 7 of the valve slide 8 of the control valve device 3, to which the actuation pressure p2 can be applied, is a differential surface (i.e., a surface area difference) between two (or a pair of facing) functional surfaces 10, 11 of the valve slide 8 that, in the axial direction, bound an area 9 of the valve slide 8 of the control valve device 3 that has a smaller diameter, by means of which the actuation pressure p2 can be adjusted together with switch (protrusions) tongues 12, 13.

When the shifting valve device 4 is in its second switch condition a total force component acts on the valve slide 8 of the control valve device 3 which moves the valve slide 8 in the direction toward a position where the actuation pressure p2 is equal to the system pressure p_sys, the total component being at least the sum of a first force component equivalent to a pressure signal p14 applied to a second functional surface 14 of the valve slide 8 of the control valve device 3, and a second force component equivalent to the actuation pressure p2 applied to the first functional surface 7 of the valve slide 8 of the control valve device 3 plus a spring force of a spring device 15 acting on the valve slide 8, such that the spring force of the spring device 15 in this case has no influence on the basic function of the control valve device 3, but only brings about a shift of the working range of the control valve device 3.

Besides the shifting valve device 4 and the control valve device 3, the hydraulic system 1 has a pressure regulation device 16 in the area of which the pilot pressure p_VS is set selectively as a function of electric control signals.

In the unpressurized operating condition of the hydraulic system 1, the valve slide 6 is pushed by a spring device 17 and the valve slide 8 by the spring device 15 to respective defined starting positions, in the present case the unpressurized conditions of the hydraulic system 1 being understood to mean one in which, essentially, the pilot pressure value set by the pressure regulation device 16 is equal to zero. In this operating condition of the hydraulic system 1, a pre-filling pressure p_VB applied to the control valve device 3 in the area of a further switch tongue 18 is passed on by control valve device 3 as an actuation pressure p2 in the direction of the shifting element 2 and emptying of the shifting element 2, which is in the open operating condition when the pre-filling pressure p_VB is applied, is avoided.

If the pilot pressure p_VS is set by the pressure regulation device 16 to within the predefined pilot pressure range, which is below the pilot pressure value at which the shifting valve device 4 changes over from the first switch condition shown in FIGS. 1 and 2 to the second, fully displaced switch condition, then the pilot pressure p_VS is applied by way of the shifting valve device 4 to the second functional surface 14 of the valve slide 8 of the control valve device 3 and moves the valve slide 8 against the spring force of the spring device 15, whereby as the displacement path of the valve slide 8 increases, the switch tongue 12 to which the system pressure p_sys is applied is increasingly connected with the switch tongue 13 by means of which the shifting element 2 is acted upon by the actuation pressure p2 that can be selectively adjusted in the area of the control valve device 3.

When the switch tongue 12 of the control valve device 3 opens, a pressure is applied to the differential surface 7 of the valve slide 8 which depends on the system pressure p_sys and the position of the valve slide 8, which displaces the valve slide 8 against the pilot pressure p_VS applied to the second functional surface 14 to an extent that reduces the actuation pressure p2 until a force equilibrium is produced at the valve slide 8. By virtue of the force equilibrium produced in each case and existing at the valve slide 8, the control valve device 3 regulates the respective actuation pressure p2 of the shifting element 2 set by the pilot pressure p_VS within the predetermined pilot pressure range, in such manner that as the pilot pressure p_VS increases continuously, the actuation pressure p2 increases proportionally.

To operate the shifting element 2 without slip in predefined operating conditions of the transmission device, the actuation pressure p2 should only be able to be regulated by the control valve device 3 up to a defined pressure level of the pilot pressure p_VS. Moreover, the actuation pressure p2 of the shifting element 2 should correspond to the system pressure p_sys.

Figure 2:
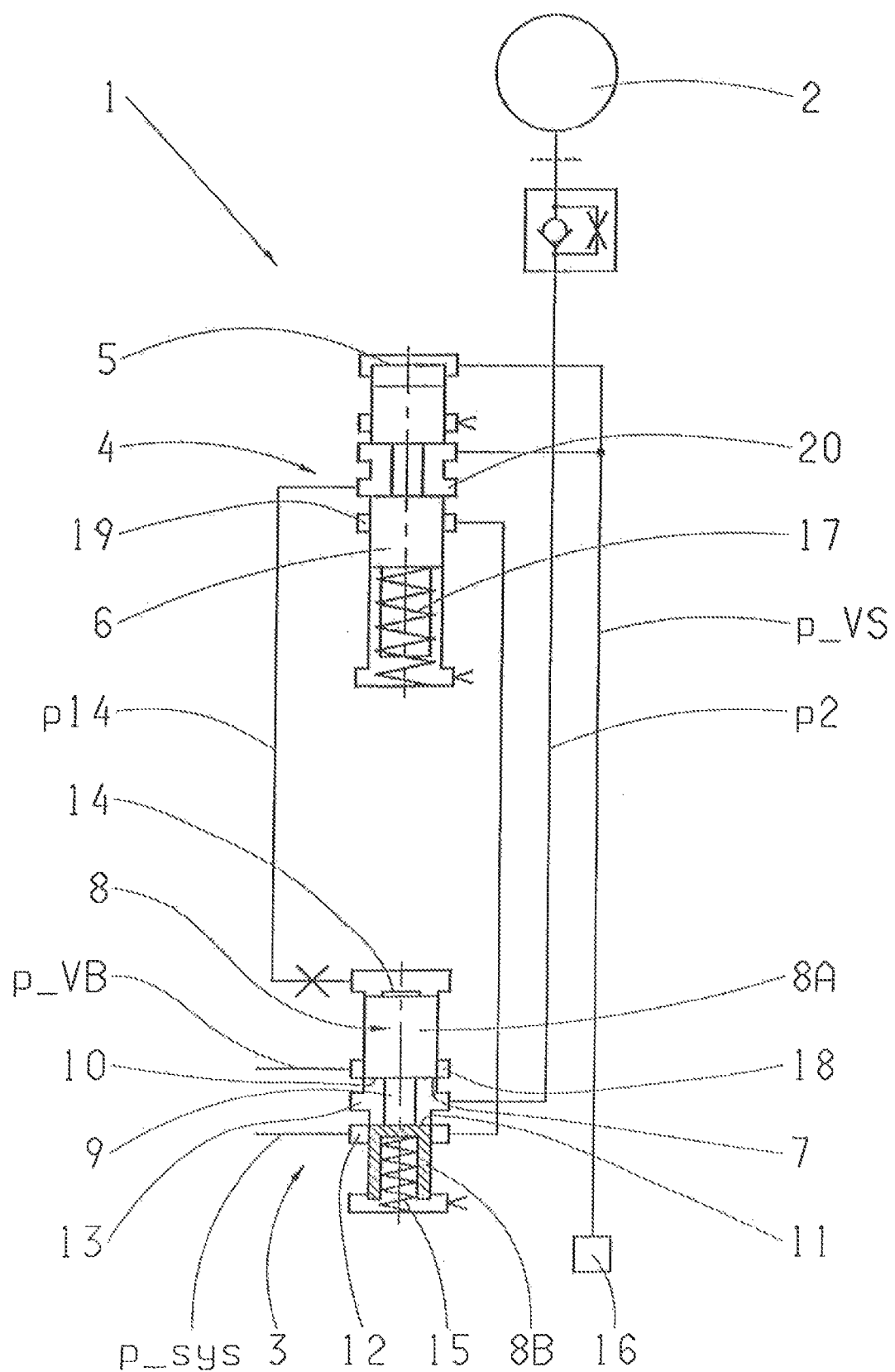
FIG. 2: Another representation of the hydraulic system of FIG. 1.

For this, above the defined pilot pressure value of the pilot pressure p_VS the shifting valve device 4 changes over from its first switch position shown in FIGS. 1 and 2 to its second, fully displaced switch position, in which the pilot pressure p_VS is no longer applied by the shifting valve device 4 as a pressure signal p14 is supplied in the direction toward the second functional surface 14 of the valve slide 8. In the second switch position of the shifting valve device 4, the actuation pressure p2 set in the area of the control valve device 3 is passed on via the switch tongue 12 in the direction of a switch tongue 19 of the shifting valve device 4 and, by way of a further switch tongue 20 of the shifting valve device 4 which is connected to the switch tongue 19 when the shifting valve device 4 is in its second switch position, is passed through as the pressure signal p14 in the direction of the second functional surface 14 of the valve slide 8 of the control valve device 3. By virtue of the second functional surface 14 of the valve slide 8, the system pressure p_sys acting in opposition to the spring force of the spring device 15 and the system pressure p_sys acting on the differential surface 7, produces an excess force of a size such that the valve slide 8 of the control valve device 3 loses its regulating function and the actuation pressure p2 corresponds to the system pressure p_sys and is applied to the shifting element 2. Accordingly, in this last-described operating condition of the hydraulic system 1 the shifting element 2 has its full transmission capability and can essentially be operated free from slip.

Figure 3:
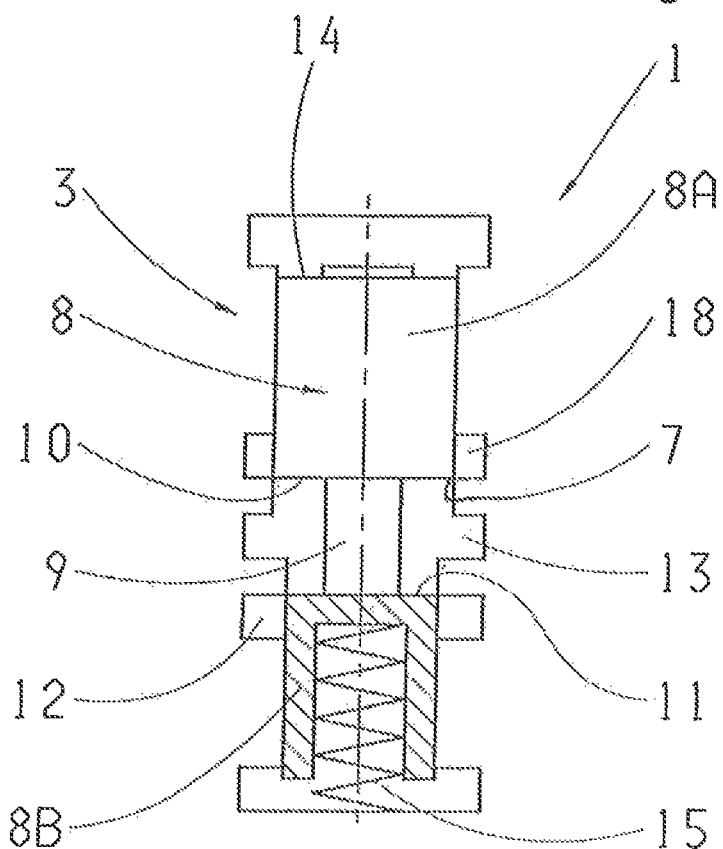
Figure 4:
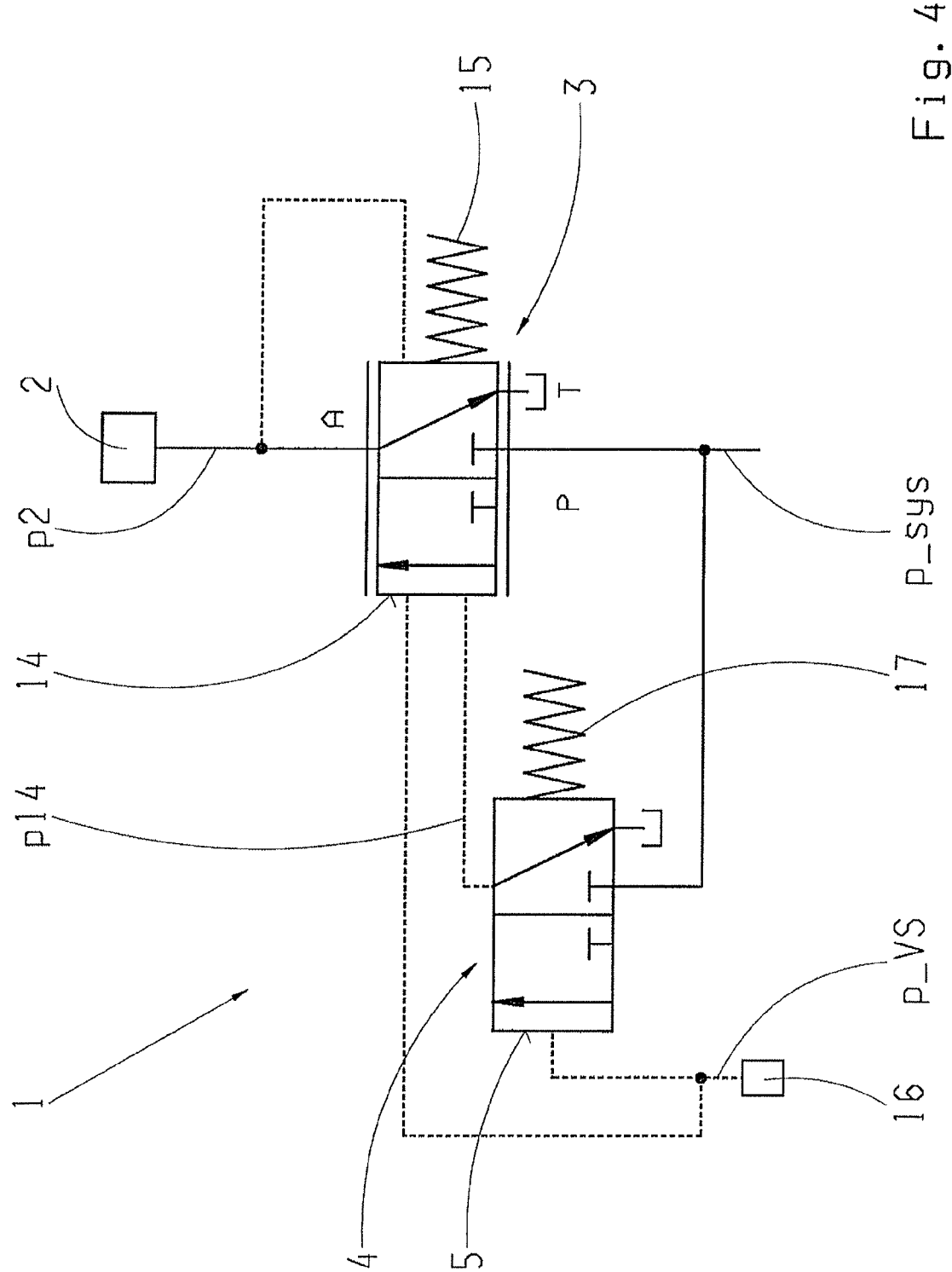
FIG. 4: A representation similar to that of FIG. 1, showing a second embodiment of the hydraulic system according to the invention.

FIG. 4 shows a representation corresponding to that of FIG. 1, of a second example embodiment of the hydraulic system 1, whose basic structure corresponds to that of the first example embodiment of the hydraulic system 1 shown in FIGS. 1 to 3, for which reason the description below will relate only to the differences between the two embodiments whereas, regarding the other functional modes of the hydraulic system according to FIG. 4, reference should be made to the description concerning FIGS. 1 to 3.

In the hydraulic system of FIG. 4, the pilot pressure p_VS is applied to the second functional surface 14 of the valve slide 8 of the control valve device 3 over the entire operating condition range of the shifting valve device 4, whereas in the first switch position of the shifting valve device 4 the system pressure p_sys is cut off from the second functional surface 14 of the valve slide 8 of the control valve device 3 and in the second switch position of the shifting valve device 4 it is passed through in the area of the shifting valve device 4 in the direction of the second functional surface 14 of the valve slide 8 of the control valve device 3 and the regulating function of the control valve device 3 is deactivated. Then, an actuation pressure p2 that corresponds to the system pressure p_sys is in turn applied to the shifting element 2.

Figure 3A:
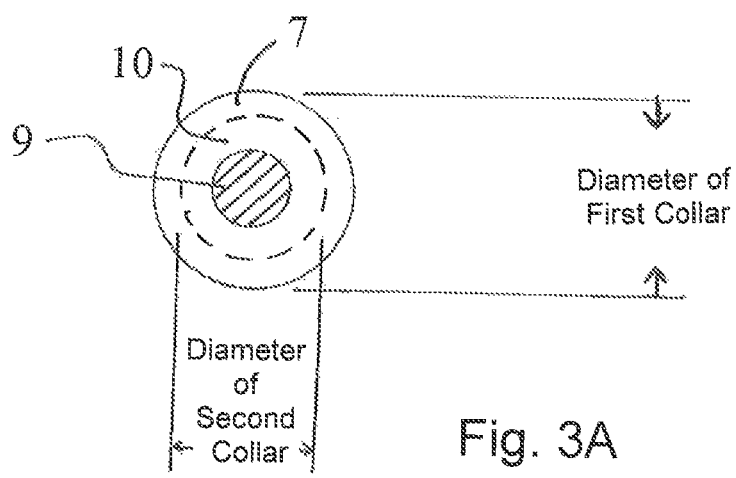
FIG. 3A is diagrammatic view of a bottom end face of the first collar showing the differential surface or feedback surface of the control valve device.

In both the embodiment of the hydraulic system 1 according to FIGS. 1 to 3 and the embodiment of the hydraulic system 1 according to FIG. 4, to override the control valve device 3 the pressure p14 applied in the area of the second functional surface 14 of the valve slide 8 of the control valve device 3 is increased from the pilot pressure p_VS to a higher pressure, i.e. to the level of the system pressure p_sys, and the regulating function of the control valve device 3 is deactivated so as to be able to act upon the shifting element 2 with the system pressure p_sys.

Figure 5:
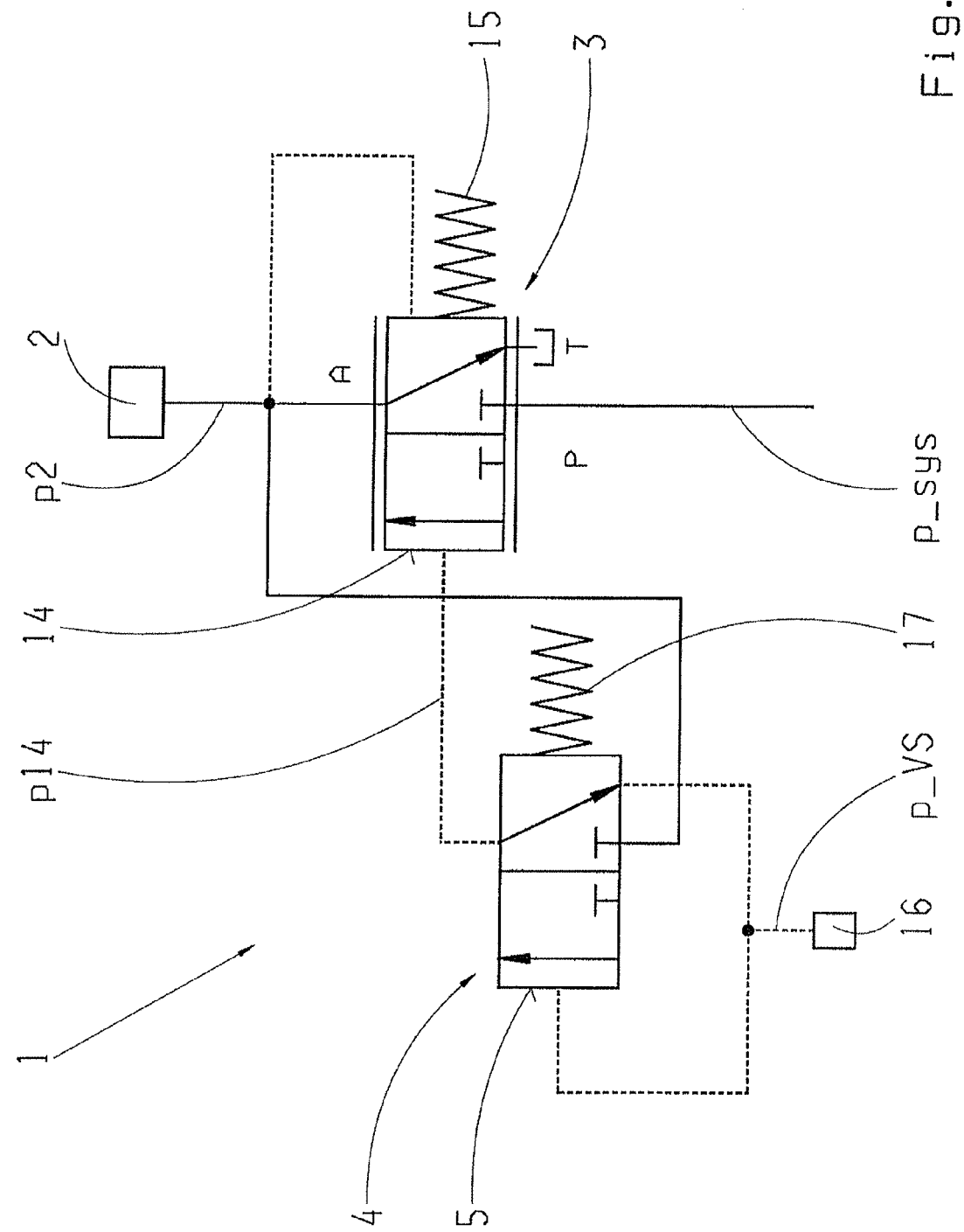
FIG. 5: A representation similar to that of FIGS. 1 and 4, showing a further embodiment of the hydraulic system according to the invention.

The embodiment of the hydraulic system 1, illustrated in FIG. 5, corresponds to and has the basic structure of the first example embodiment of the hydraulic system 1 shown in FIGS. 1 to 3. In view of this, the description below will relate only to the differences between the two embodiments according to the invention.

According to this embodiment of the hydraulic system 1 shown in FIG. 5, when the shifting valve device 4 is in its second switch condition, the actuation pressure p2 of the shifting element 2 is fed, via the shifting valve device 4, to the second functional surface 14 of the valve slide 8 of the control valve device 3 as a pressure signal p14 for the control valve device 3. In this way, in a space-saving and inexpensive manner and without additional pressure control means, the actuation pressure p2 of the shifting element 2 can be increased to a pressure level required for slip-free operation of the shifting element 2 in an operating-condition-dependent manner.

INDEXES

1 Hydraulic system
2 Shifting element
3 Control valve device
4 Shifting valve device
5 First functional surface of the valve slide of the shifting valve device
6 Valve slide of the shifting valve device
7 First functional surface of the valve slide of the control valve device
8 Valve slide of the control valve device
8A, 8B Collar of the valve slide of the control valve device
9 Area with reduced diameter
10, 11 Functional surface
12, 13 Shift tongue
14 Second functional surface of the valve slide of the control valve device
15 Spring device
16 Pressure regulating device
17 Spring device
18 Further shift tongue of the control valve device
19 Shift tongue of the shifting valve device
20 Further shift tongue of the shifting valve device
p2 Actuation pressure
p14 Pressure signal
p_sys System pressure
p_VB Pre-filling pressure
p_VS Pilot pressure

The invention claimed is:

1. A hydraulic system (1) for actuating at least one shifting element (2) of a transmission device, with a pilot-controlled control valve device (3) and in functional connection therewith an also pilot-controlled shifting valve device (4),
an actuation pressure (p2) of the shifting element (2), when the shifting valve device (4) is in a first switch position, being regulated by the control valve device (3) within a defined pilot pressure range, and above a pilot pressure value (p_VS) that can be applied to a first functional surface (5) of a valve slide (6) of the shifting valve device (4), the shifting valve device (4) moving to a second switch position, in which the actuation pressure (p2) of the shifting element (2) corresponding to a system pressure (p_sys) that can be applied to the control valve device (3),
the actuation pressure (p2) of the shifting element (2) can be applied to a first functional surface (7) of a valve slide (8) of the control valve device (3), acting in a direction which reduces the actuation pressure (p2),
the first functional surface (7) of the valve slide (8) of the control valve device (3), to which the actuation pressure (p2) can be applied, being a surface area difference between a pair of facing functional surfaces (10, 11) of the valve slide (8) which, in an axial direction, bound an area (9) of the valve slide (8) of the control valve device (3) with a smaller diameter, by which the actuation pressure (p2) can be adjusted conjointly with switch protrusions (12, 13) such that, when the shifting valve device (4) is in the second switch position, the valve slide (8) of the control valve device (3) being acted upon by a total force component that moves the valve slide (8) of the control valve device (3) to a position in which the actuation pressure (p2) is equal to the system pressure (p_sys), and
the total force component being at least a sum of a first force component equivalent to a pressure signal (p14) applied to a second functional surface (14) of the valve slide (8) of the control valve device (3) and a second force component equivalent to the actuation pressure (p2) applied to the first functional surface (7) of the valve slide (8) of the control valve device (3).

2. The hydraulic system according to claim 1, wherein, in the second switch position of the shifting valve device (4), the actuation pressure (p2) of the shifting element (2) is fed, via the shifting valve device (4), to the second functional surface (14) of the valve slide (8) of the control valve device (3), as the pressure signal (p14) for the control valve device (3).

3. The hydraulic system according to claim 1, wherein, in the second switch position of the shifting valve device (4), the system pressure (p_sys) is applied to the second functional surface (14) of the valve slide (8) of the control valve device (3).

4. The hydraulic system according to claim 1, wherein, in the second switch position of the shifting valve device (4), the actuation pressure (p2) of the shifting element (2) and the pilot pressure (p_VS) of the control valve device (3) are applied, as the pressure signal (p14), to the second functional surface (14) of the valve slide (8) of the control valve device (3).

5. The hydraulic system according to claim 1, wherein, below the predefined pilot pressure value (p_VS), the valve slide (6) of the shifting valve device (4) and the valve slide (8) of the control valve device (3) are in each case movable by a respective spring device (17, 15) to defined starting positions in which the actuation pressure (p2) of the shifting element (2) corresponds to a pre-filling pressure value (p_VB).

6. The hydraulic system according to claim 1, wherein a common pressure regulation device (16) adjusts the pilot pressure (p_VS) of the shifting valve device (4) and the control valve device (3).

7. A hydraulic system (1) for actuating at least one shifting element (2) of a transmission device, the hydraulic system comprising:

a pilot-controlled control valve device (3) which is functionally connected with a pilot-controlled shifting valve device (4);

the shifting valve device (4) being movable between first and second positions, an actuation pressure (p2) of the shifting element (2) being regulated by the control valve device (3) within a defined pilot pressure range when the shifting valve device (4) is in the first switch position;

above a pilot pressure value (p_VS) that is applied to a first functional surface (5) of a valve slide (6) of the shifting valve device (4), the shifting valve device (4) moving to a second switch position and, in the second switch position of the shifting valve device (4), the actuation pressure (p2) of the shifting element (2) corresponding to a system pressure (p_sys) that is applyable to the control valve device (3);

the actuation pressure (p2) of the shifting element (2) being applied to a first functional surface (7) of a valve slide (8) of the control valve device (3), acting in a direction which reduces the actuation pressure (p2);

the first functional surface (7) of the valve slide (8) of the control valve device (3) being a surface area difference between a pair of facing functional surfaces (10, 11) of the valve slide (8) which, in an axial direction, bound an area (9) of the valve slide (8) of the control valve device (3) with a smaller diameter by which the actuation pressure (p2) is adjustable conjointly with switch protrusions (12, 13), such that when the shifting valve device (4) is in the second switch position, the valve slide (8) of the control valve device (3) being acted upon by a total force component that moves the valve slide (8) of the control valve device (3) to a position in which the actuation pressure (p2) is equal to the system pressure (p_sys); and the total force component being at least a sum of a first force component that is equivalent to a pressure signal (p14) applied to a second functional surface (14) of the valve slide (8) of the control valve device (3) and a second force component that is equivalent to the actuation pressure (p2) applied to the first functional surface (7) of the valve slide (8) of the control valve device (3).

* * * * *